Dec. 30, 1969  S. CEDERBERG ET AL  3,486,793
SAFETY SEAT BELT FOR VEHICLES

Filed April 27, 1967  4 Sheets-Sheet 1

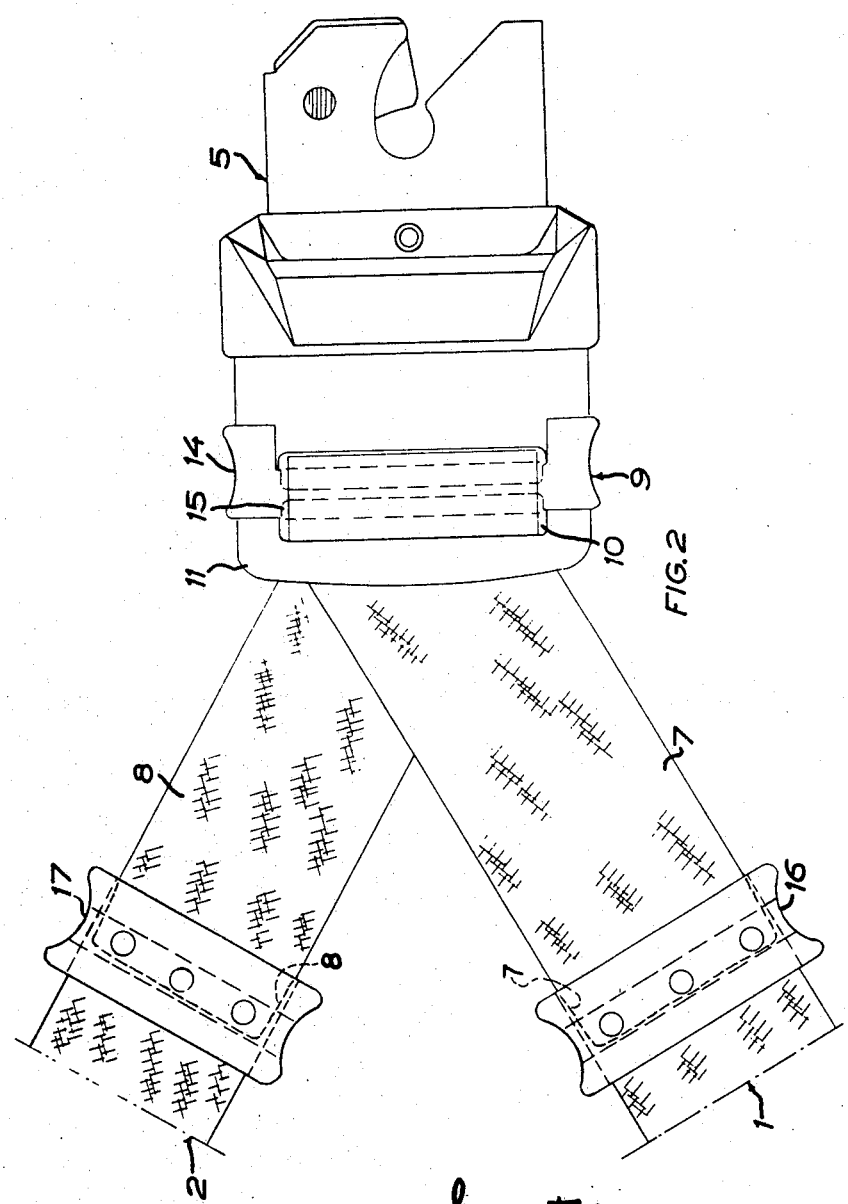

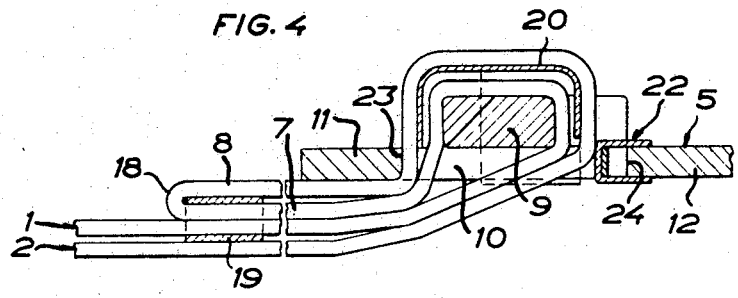
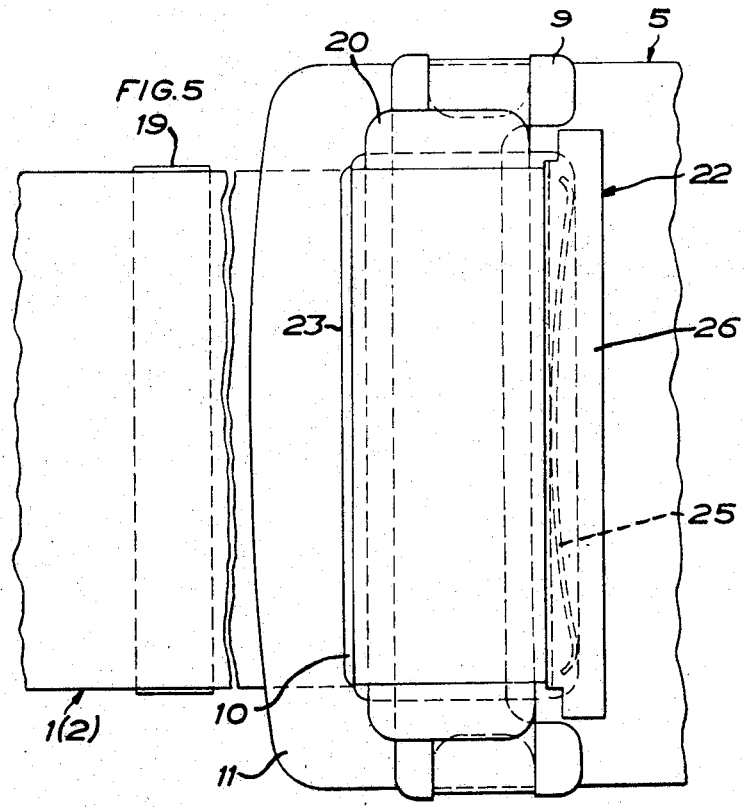

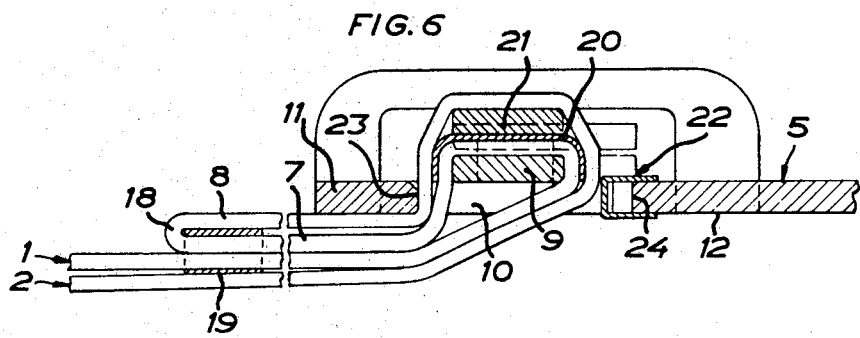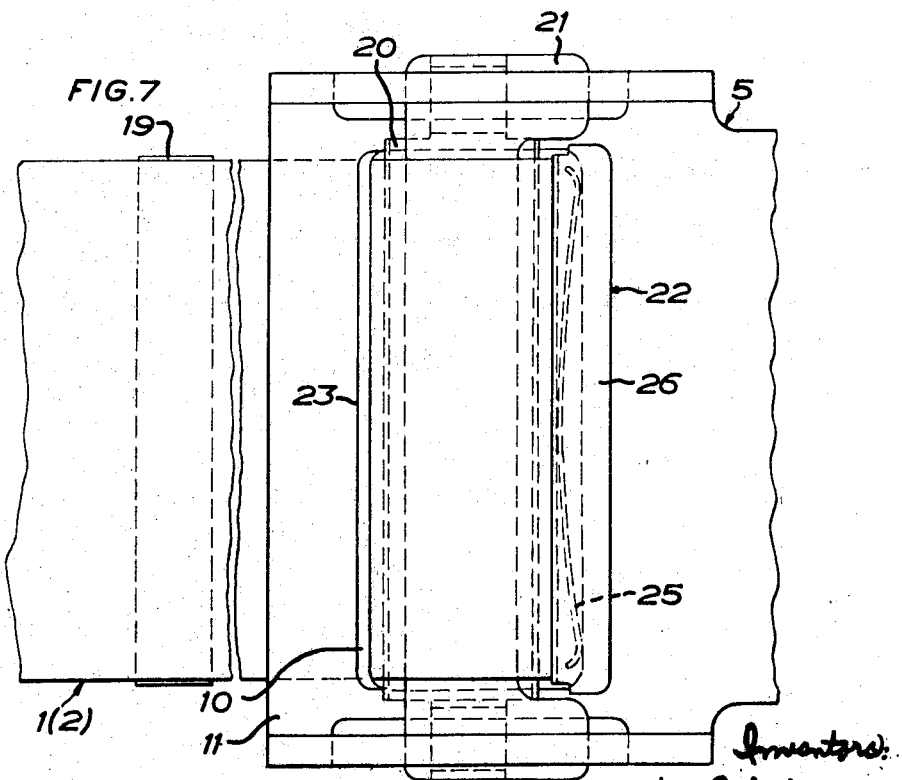

United States Patent Office 3,486,793
Patented Dec. 30, 1969

3,486,793
SAFETY SEATBELT FOR VEHICLES
Sten Cederberg and Harry M. Nygren, Monsteras, Sweden, assignors to AB Industrifjadrar, Monsteras, Sweden
Filed Apr. 27, 1967, Ser. No. 634,276
Claims priority, application Sweden, July 5, 1966, 9,142/66
Int. Cl. A62b 35/00; B60r 21/10
U.S. Cl. 297—389                    5 Claims

ABSTRACT OF THE DISCLOSURE

A safety belt having shoulder and hip straps attached to a common buckle with the two belt straps having portions of the straps collectively passed about a bar means movable in relation to an opening in a plate included in the buckle and additionally using, in the embodiments shown, spring means for preventing automatic advance of the straps and inserts between the straps for individual adjustment of the straps.

---

The present invention relates to safety seatbelts of the shoulder and hip strap variety, and more partcicularly to convenient adjusting means at a buckle to which both straps are attached.

In prior art safety seatbelts, the belt straps were adjustable in length either at one anchorage point or at the two anchorage points in the vehicle. Such anchorage points being difficult to get at, the seat occupants, for reasons of convenience, often neglected to adjust their seatbelts, such neglect leading, in some cases, to serious consequences. The object of the safety seatbelt, according to the present invention, is to eliminate these shortcomings.

In the safety seatbelt for vehicles of the present invention, there are two straps adjustable in length, namely the shoulder and hip straps, having their end portions connected to a buckle at which the straps may both be adjusted in their length.

Accordingly, the present invention is directed to an adjusting device which allows convenient adjustment of both shoulder and hip straps at a buckle to which both straps are attached.

The above features of the invention will become more fully apparent from the following description in which reference is made to the accompanying drawings illustrating some embodiments, chosen by way of example of the safety seatbelt.

In the drawings:

FIGURE 2 is a top plan view of the buckle with the two belt straps, in the embodiment shown in FIGURE 1;

FIGURE 4 is a longitudinal section of the buckle with the belt straps, in a third embodiment;

FIGURE 5 is a top plan view of the buckle with the two belt straps, in the embodiment shown in FIGURE 4;

FIGURE 6 is a longitudinal section of the buckle with the belt parts, in a fourth embodiment;

FIGURE 7 is a top plan view of the buckle with the belt parts, in the embodiment shown in FIGURE 6.

Figure 1:
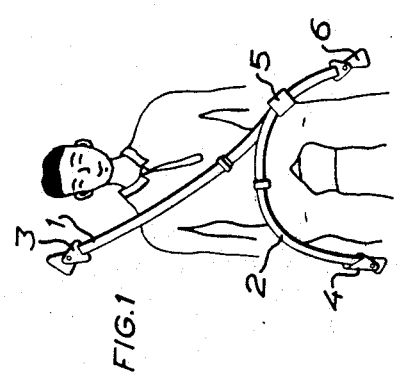
FIGURE 1 is a diagrammatic view showing a seat occupant strapped to his seat by means of the safety seatbelt, in one embodiment thereof.

The safety seatbelt more specifically is intended for use in motor-cars, buses, aircraft etc. The safety seatbelt consists of two belt straps 1 and 2 adjustable in length, and one belt strap is to extend, in the manner of the ribbon of an order, from a first anchorage point 3 in the vehicle obliquely downwardly over one shoulder and the thorax of the seat occupant, while the second belt strap 2 is to pass across the hips of the seat occupant from a second anchorage point 4 in the vehicle on the same side of the seat occupant as the first anchorage point 3. The two belt straps 1 and 2 have the ends facing away from anchorage points 3 and 4 connected with a buckle 5 which serves directly or indirectly to connect the two belt straps 1 and 2 with a third anchorage point 6 on the side of the seat occupant opposed to the side where the other two anchorage points 3 and 4 are situated. The safety seatbelt thus is a so-called three-point type belt.

The belt straps 1 and 2 are adjustable in length so that the safety seatbelt can be adjusted to different persons and to different positions of the seat in relation to the anchorage points 4–6 in the vehicle, the adjustment being effected at the buckle 5 which is always readily accessible. The strap end portions 7 and 8 connected to the buckle 5 are thus collectively passed about a bar 9 or like member which serves as a latch and which to provide the latching action is movable relative to an opening 10 in a plate 11 of the buckle 5. The two belt straps extend from the same side 12 of the plate 11 into the opening 10 and back out of it. By this arrangement the two straps 1 and 2 are individually adjustable in length with regard to the latch 9 common to them.

As will appear from the drawings the latch 9 is a sheet metal member which is movable along the plate 11 on the side 13 thereof, which is opposed to the side 12. The sheet metal member which has for example arcuate surfaces 14 for the fingers to engage with, is connected with the plate 11 by means of a sheet metal member 15 which permits the latch to perform the movement required for latching the strap end portions 7, 8. In a modification the latch 9 may be a knurled rod of circular cross section having end grooves therein with which are engaged the extreme edges of the opening 10.

In the embodiment illustrated in FIGURE 2 the two strap end portions 7 and 8 cooperating with the buckle 5 are connected at the ends by means of rivets with sleeve-shaped fittings 16 and 17 each of which surrounds one of the two belt straps 1 and 2 passing to the buckle 5. Each of the sleeve-shaped fittings 16 and 17 is adapted to surround the belt straps 1 and 2, respectively. To realize length adjustment the seat occupant has to actuate the fitting at the strap which he wants to adjust. However, in certain cases it may be advantageous to have the fittings 16 and 17 surround the other belt strap. For length adjustment of the shoulder strap 1 the seat occupant therefore has to actuate the fitting at the hip strap 2, and vice versa.

Figure 3:
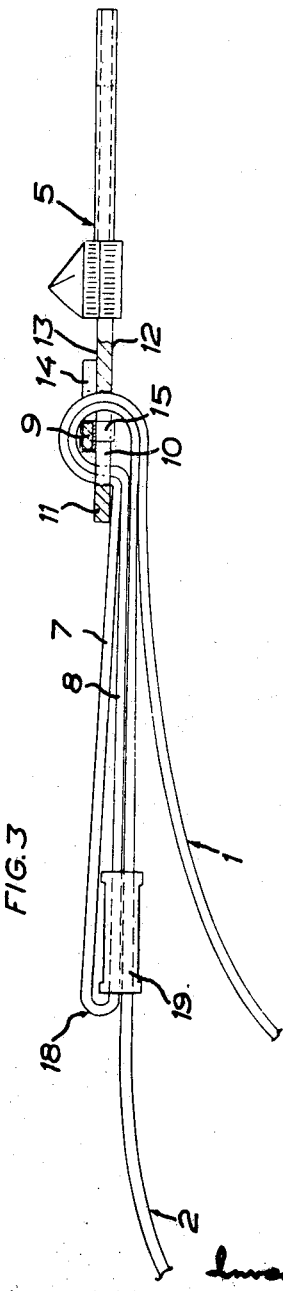
FIGURE 3 is a side elevation, partly in section, of the buckle with the two belt straps, in a second embodiment.

In the embodiment shown in FIGURE 3 the two belt straps 1 and 2 are formed by a continuous strap, the portion uniting the two belt straps 1 and 2 constituting a continuous loop 18 which extends from the plate 11 and should be connected to one of the belt straps 1 and 2 by means of a sleeve 19. The loop 18 could be inserted with its doubled end portion in the sleeve 19 which is movable on the belt strap 2. In the preferred embodiment illustrated the sleeve 19, however, surrounds but a single part of the loop 18 so that the sleeve 19 is non-releasably connected with the loop 18. Any conceivable adjustment of the length of the belt straps 1 and 2 can be effected in spite of the sleeve 19. After finished adjustment the seat occupant only has to slide the sleeve 19 along the belt strap 2 away from the buckle 5 until it is stopped, in which position the two portions 7 and 8 forming the loop 18 lie stretched one against the other, and will appear from the drawings. Like the fittings 16 and 17, the sleeve 19 has been given such a shape that a certain force has to be exerted to move it along the belt strap.

When not actuated, the sleeve 19 will therefore remain in the position into which it has been adjusted.

In the embodiments shown in FIGURES 2 and 3 the two belt straps 1 and 2 collectively passed about the latch 9 bear against one another at said latch. In the embodiments shown in FIGURES 4–7 an insert 20 in the form of a plate or like element is disposed between the two belt straps 1 and 2 collectively passed about the latch 9. By this arrangement the belt straps 1 and 2 will be individually adjustable in length fully independently of each other at the latch 9.

According to FIGURES 4–7 the insert 20 is a sheet metal member but it may also be made of synthetic plastics or like material permitting the straps to be slid in relation to one another for the desired length adjustment thereof.

The insert 20 is substantially of U-shape in cross section, the U-limbs grasping the bar 9 and the strap 1 closest to it.

The insert 20 is connected with the bar 9 or the buckle 5 so as not to counteract in any way the latching action, which is of the utmost importance in point of safety.

In the embodiment shown in FIGURES 6 and 7 the insert 20 is reinforced by a bar 21 substantially of the same nature as the bar 9. As a consequence, the bar 9 can be made slimmer than would otherwise be possible, which will appear from a comparison between FIGURES 4 and 6.

According to the drawings, the buckles in the two embodiments shown in FIGURES 4–7 are provided with a spring mechanism 22 which tends to press the latch 9 cooperating with the two belt straps 1 and 2 against that edge 23 of the opening 10 where latching takes place. Also the buckle in the two embodiments shown in FIGURES 2 and 3 may to advantage have such a spring mechanism 22 which has the object of preventing an automatic advance of the straps 1 and 2, which would otherwise occur in connection with the loading and unloading of the straps 1 and 2 in the use of the safety seatbelt.

The spring mechanism 22 is arranged at the edge 24 of the opening 10, that is, opposite to the edge 23 where latching takes place. The spring mechanism 22 preferably is an element 26 which is actuated by a leaf spring 25 and extends throughout the width of the opening 10, which essentially coincides with the width of the straps 1 and 2.

In the preferred embodiment illustrated the element 26 is a U-shaped plate, the limbs of which grasp the plate 11 of the buckle, the leaf spring 25 being disposed between the edge 24 of the opening 10 and the web of the element 26 in said opening.

The spring of the spring mechanism 22 can be arranged, in another embodiment, to directly engage the latch 9, the spring preferably bearing against lugs at the surfaces 14 provided for the fingers to engage with.

What we claim and desire to secure by Letters Patent is:

1. A safety seatbelt for vehicles comprising two straps of adjustable length, one of which extends from a first anchorage point in the vehicle obliquely downward over one shoulder and the thorax of the seat occupant, and the other strap passing across the hips of the seat occupant from a second anchorage point in the vehicle on the same side of the seat occupant as said first anchorage point, a buckle connecting said two belt straps at their ends away from said two anchorage points to a third anchorage point in the vehicle on the side of the seat occupant opposite from the side from where the other two of said anchorage points are situated, said buckle including a plate, a bar means acting as a latch over which portions of said two belt straps are collectively passed to provide latching action, said two belt straps extending from the same side of said plate, and an insert in the shape of a plate disposed between said two belt straps collectively passed about said latch.

2. A safety seatbelt as claimed in claim 1, in which said insert is substantially U-shaped in cross section, the U-limbs of said insert grasping said latch and said strap closest to it.

3. A safety seatbelt as claimed in claim 1, in which said insert is connected with said latch.

4. A safety seatbelt as claimed in claim 1, in which said insert is reinforced with a rod substantially of the same nature as said latch.

5. A safety seatbelt for vehicles comprising two straps of adjustable length, one of which extends from a first anchorage point in the vehicle obliquely downward over one shoulder and the thorax of the seat occupant, and the other strap passing across the hips of the seat occupant from a second anchorage point in the vehicle on the same side of the seat occupant as said first anchorage point, a buckle connecting said two belt straps at their ends away from said two anchorage points to a third anchorage point in the vehicle on the side of the seat occupant opposite from the side from where the other two of said anchorage points are situated, said buckle including a plate, a bar means acting as a latch over which end portions of said two belt straps are collectively passed to provide latching action, said two belt straps extending from the same side of said plate, said end portions of said belt straps which cooperate with said buckle being connected at the ends with sleeve-shaped fittings, each surrounding one of said two belt straps extending to said buckle.

References Cited

UNITED STATES PATENTS

| | | | |
|---|---|---|---|
| 3,043,625 | 7/1962 | Bohlin | 297—389 |
| 3,243,233 | 3/1966 | Davis | 297—389 |
| 3,258,293 | 6/1966 | Sharp | 297—389 |
| 3,293,713 | 12/1966 | Gaylord | 297—385 |
| 3,317,243 | 5/1967 | Neman | 297—389 |

JAMES T. McCALL, Primary Examiner